(12) United States Patent
Watanabe et al.

(10) Patent No.: US 7,245,990 B2
(45) Date of Patent: Jul. 17, 2007

(54) INDUSTRIAL ROBOT

(75) Inventors: Atsushi Watanabe, Tokyo (JP); Hiroji Nishi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 764 days.

(21) Appl. No.: 10/720,745

(22) Filed: Nov. 25, 2003

(65) Prior Publication Data

US 2004/0133312 A1 Jul. 8, 2004

(30) Foreign Application Priority Data

Dec. 2, 2002 (JP) ............................. 2002-350272

(51) Int. Cl.
G05B 15/00 (2006.01)
G05B 19/00 (2006.01)

(52) U.S. Cl. .................. 700/264; 700/248; 700/250; 700/251; 700/252; 700/253; 700/255; 700/257; 700/259; 700/260; 700/262; 318/568.1; 318/568.11; 318/568.13; 318/568.14; 318/588.16; 318/568.21; 318/568.23; 901/4; 901/43; 901/47

(58) Field of Classification Search ................. 700/264
See application file for complete search history.

(56) References Cited

U.S. PATENT DOCUMENTS 4,178,632 A * 12/1979 Anthony .................... 700/251
6,282,460 B2 * 8/2001 Gilliland et al. ............ 700/255
6,522,949 B1 * 2/2003 Ikeda et al. ................. 700/245
6,853,878 B2 * 2/2005 Hirayama et al. .......... 700/245
7,136,723 B2 * 11/2006 Hirayama et al. .......... 700/245

FOREIGN PATENT DOCUMENTS

JP 61-190605 8/1986
JP 06-032587 2/1994

OTHER PUBLICATIONS

FANUC Robotics, A new age of industry customer training schedule, 2002, Internet, p. 1-23.*
Nakamura et al., Multimedia communicaiton pendant for sensor-based robotic task teaching by sharing information—Modular structure adn application to sensing systems, 1998, IEEE, p. 1166-1171.*
Notice of Reasons for Rejection for corresponding Japanese Application No. 2002-350272 mailed Mar. 1, 2005.

* cited by examiner

*Primary Examiner*—Thomas Black
*Assistant Examiner*—Marc McDieunel
(74) *Attorney, Agent, or Firm*—Staas & Halsey LLP (57) ABSTRACT

A robot control unit for controlling a robot mechanism unit constantly detects the status of a robot and stores it as robot status data. An operation command input by voice from a head set is converted into character data by a voice/character data conversion device, and input to a control device. The control device searches a command corresponding to an operation command input in operation commands stored in management data. An executing program group is specified for link and storage with the corresponding operation command.

11 Claims, 5 Drawing Sheets

| x | y | z |
|---|---|---|
| 1 | ROBOT DOES NOT HOLD WORKPIECE | STOP ROBOT |
| 2 | LIFT WORKPIECE | LOWER AND PLACE WORKPIECE ON PROVISIONAL TABLE |
| 2 | HORIZONTALLY MOVE WORKPIECE | CONTINUE MOVING WORKPIECE AND PLACE IT ON PALLET |
| 2 | LOWER WORKPIECE | CONTINUE LOWERING WORKPIECE AND PLACE IT ON PALLET |
| 3 | HOLD WORKPIECE | RELEASE WORKPIECE AND STOP OPERATION |

INDUSTRIAL ROBOT

BACKGROUND OF THE INVENTION

1. Field of the Invention

The present invention relates to and industrial robot, and more particularly to an industrial robot to which an operation command can be easily issued.

2. Description of the Related Art

To operate an industrial robot, it is necessary to prepare a robot program for the industrial robot describing positions of operating points of the robot and/or a signal input/output for interlock with other components in the system.

A robot program describes all operations of a robot in a process in which the robot is directed to start the production, performs production activities such as welding, transferring, etc. using tools attached to the tip of the hands of the robot, and completes the production. Therefore, there may be no problems when a robot program is thoroughly executed from the start to the end of the program. However, it is difficult to perform only a part of the operations of a robot described in a robot program, to temporarily omit apart of the operations, or to stop the operation of a robot at a certain point of a first robot program to perform there a part of an operation described in a second robot program and then resume the first robot program, etc.

For example, to verify whether a robot can correctly perform each operation described in a robot program in conformance with the intentions of an operator, it may be desirable that a robot program is not executed from the beginning, but a portion of the operation to be verified is repeatedly performed a number of times. To do this, the program counter of a robot program is forcibly moved to the position where operation is to be started hereafter, a verification is made at this position for the current position of the robot, the status of an I/O signal, the value of a register, etc., they are manually changed so that the current position of the robot, the status of the I/O signal, and the value of the register are the same as those assumed when the robot program is executed from the beginning, and then the robot program is resumed and the operation to be verified is performed by the robot. To make a verification on the same operation again, the above-mentioned operation must be repeated.

When a robot program is continuously performed from the start to the end of it, and when an attempt is made to temporarily stop the robot program, and then perform it from the beginning, if, for example, the robot program is suddenly stopped while the robot is carrying a heavy object, then there may be a problem that interference with surrounding equipment occurs by dropping a carried object and/or the displacement of an operation path. Therefore, the operator is required to stop the robot program at a stop timing determined by the operator.

When a robot holds a heavy workpiece, but the workpiece is still placed on the worktable, there may be no problem if a signal is manually output to open the hand of the robot to the hand holding the workpiece. However, if the hand is opened with the workpiece lifted from the worktable, then the workpiece may be dropped. Therefore, when the operator manually outputs a signal, he or she carefully considers the status of the robot before issuing an open hand command.

For an industrial robot operated in a spot-welding line, if an alarm is given to the robot operated in the welding operation on the inside of a car using a welding gun, and it is determined based on the cause of the alarm that it is not possible to resume the robot program, then the welding gun is fully opened first, the robot is manually moved to set the welding gun outside the car to the point where the robot and the car do not interfere with each other, and it is necessary to execute the robot program again from the beginning. In the spot-welding line, normally a plurality of robots are operated, and the robots are interlocked using I/O signals, etc. to avoid the interference between robots. Therefore, another robot may be waiting for the completion of the spot-welding operation of the robot in which an alarm is occurred. In this case, after manually moving the robot to the position where there is no interference between robots, it is necessary to issue an interlock signal after the manual completion of the welding operation. After an alarm is given and the robot is stopped, manual recovery is required to recover the robot and to resume the operation of the line.

Furthermore, when an alarm is given in a production line, the contents of the alarm is understood to identify the cause of the alarm, the alarm code is verified on a teaching pendant of the robot to remove the cause of alarm, the meaning of the alarm code is examined referring to a robot manual, the parts that may contribute to the alarm is identified, and then the status signal for the parts is checked on the teaching pendant. Practically, it is difficult to immediately identify the parts that may contribute to the alarm, and check the statuses of the parts, and it is necessary to check each of a large number of parts that may contribute to the alarm in order of possibility from the highest to the lowest so that a part which causes the alarm can be located. In checking the parts, it is necessary to display a screen of the status signal on the teaching pendant to check the status signal.

Even when the cause of the alarm has been known and removed and the robot program is resumed from the alarm-causing point, the robot has coasted due to an emergency stop when an alarm is given. Therefore, if the program is resumed as it is, the robot will not follow the taught operation path, thereby causing the problem that the robot interferes with surrounding equipments, jigs, etc. To correctly resume the program, the robot has to be manually moved onto the original operation path before resuming the program.

As described above, in the conventional techniques, it is difficult to perform only a part of the operations of a robot described in a robot program, to temporarily omit a part of the operations, or to stop the operation of a robot at a certain point to perform there an operation not described in the robot program and then resume the robot program safely and easily. Furthermore, to verify that the robot can perform the operations correctly, it is desirable that a relevant part is repeatedly performed, but it is not easy to perform such operations.

When a robot program is stopped, it is necessary to determine the situation, and carefully consider the stop timing. When a robot is manually operated using an open hand command, it is also necessary to carefully check the current situation of the robot to avoid an undesired operation. When an alarm is given to terminate the robot program halfway, an operator must perform the operation necessary for terminating the program according to circumstances.

Furthermore, to identify the cause of an alarm, the operator has to check the status of all of a number of parts that may contribute to the alarm on a teaching pendant. When the program is resumed after the issue of alarm, the operator has to determine a necessary operation to resume the program according to circumstances, and to resume the robot operation after performing the necessary operation.

To allow a robot to perform an operation, it is necessary for an operator to manually perform required operations based on the teaching pendant or the like before causing the robot to perform the operation. That is, the operator does not allow the robot to freely perform an operation. Instead, he or she first determines, according to the status of the robot, additional operations required for accomplishing the operation or divisions of the additional operations into smaller operations before carrying out the operation, and then performs a number of smaller operations by manual operation on a teaching pendant or by executing a robot program. That is, the operator cannot directly issue an operation command to the robot. The operation which the operator originally desired to perform cannot be performed by a robot.

As a result, when an unskilled operator operates a robot, he or she cannot check up correct and necessary operation, and therefore it is not possible to cause the robot carry out a required operation. Even when the operation can be correctly analyzed, some operations must be manually performed on a teaching pendant, some operations must be performed by executing a robot program, thereby requiring different means for performing an operation. Therefore, an operator who cannot correctly determine means for performing an operation cannot allow a robot to perform a requested operation. That is, an operator who can correctly operate a robot has to correctly determine means for performing an operation, requiring expertise. Thus, there is a problem that every operator cannot correctly operate a robot.

SUMMARY OF THE INVENTION

The industrial robot according to a first embodiment of the present invention comprises: storage means for storing a plurality of operation commands in which one or more executing programs are associated with each of the operation commands; means for detecting an operation command corresponding to an input operation command, from among the plurality of operation commands stored in the storage means; determination means for determining whether or not one or more executing programs corresponding to the detected operation command are to be executed, according to the status of a robot; and means for executing the executing program determined to be executed.

A determination order is preset by the determination means on the plurality of executing programs corresponding to each of the operation commands.

The industrial robot according to a first embodiment of the present invention comprises: storage means for storing a plurality of operation commands and a predetermined units of execution programs that may be required to execute and complete the operation command, in which the executing programs are associated with each of the operation commands and. execution order; means for detecting an operation command corresponding to an input operation command, from among the plurality of operation commands stored in the storage means; determination means for determining whether or not the executing programs corresponding to the detected operation command are to be executed according to the status of a robot and the execution order; and means for executing the executing program determined to be executed.

In case where the determination means determine to execute one executing program, among a plurality of executing programs corresponding to the each operation command, the determination means may determine not to execute the other executing programs in the same execution order.

The first and second embodiments of the industrial robot according to the present invention can include the following aspects.

Voice input means for inputting an operation command by voice of an operator may be provided. The voice input means is provided for a teaching pendant of the industrial robot. It also public address system using an operator's voice.

Means for displaying contents of the executing program determined to be executed or means for accepting an execution permission are provided.

An accepted operation command is displayed using characters on a teaching pendant of the industrial robot or a screen of an operation panel.

An accepted operation command is displayed using characters on a screen of an information processing device connected to the industrial robot.

An accepted operation command is also notified by a lamp or voice.

According to the present invention, a command can be easily issued to a robot during the operation including the stopped state, and the robot itself performs only necessary operation processing and automatically performs a specified operation, thereby facilitating the issuance of a command to a robot easily and safely.

BRIEF DESCRIPTION OF THE DRAWINGS

The above mentioned and other objects and features of the present invention will become more apparent with reference to the following detailed description of the invention taken in conjunction with the accompanying drawings, wherein.

DETAILED DESCRIPTION OF THE PREFERRED EMBODIMENTS

Figure 1:
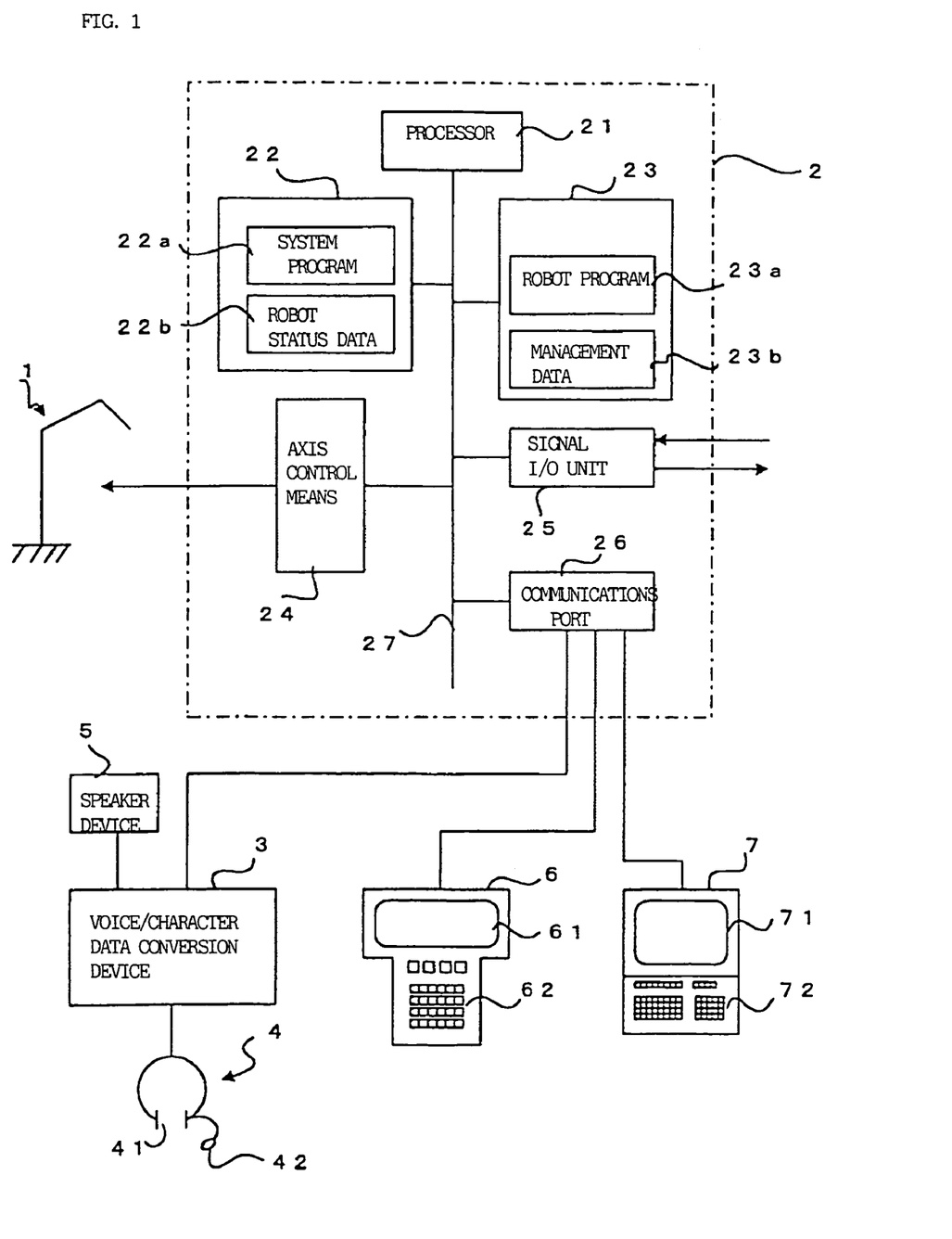
FIG. 1 shows the outline of an embodiment of the present invention.

FIG. 1 shows the outline of an embodiment of the present invention. The embodiment comprises a robot mechanism unit 1, and a robot control unit 2 for controlling the robot mechanism unit 1. In the robot control unit 2, system memory 22 for storing a system program 22a and robot status data 22b indicating the current status of the robot, non-volatile program memory 23 for storing a robot program 23a and management data 23b for managing the robot program 23a, a communications port 26, and a signal input/output unit 25 for inputting/outputting a signal to and from external equipment are connected to a processor 21 through a bus 27. The processor 21 constantly detects the current value of the robot mechanism unit 1 and the status of the signal input/output unit 25 by the system program 22a, and writes them as the robot status data 22b to the system memory 22. A voice/character data conversion device 3, a teaching pendant 6, and an information processing device 7 are connected to the communications port 26.

A head set 4 for an operator to put on the head is connected to the voice/character data conversion device 3. The voice/character data conversion device 3 recognizes the input voice, converts the voice into character data, and also converts the input character data into voice. The head set 4 comprises a headphone 41 as a voice output device and a microphone 42 as a voice input device. The voice/character data conversion device 3 recognizes the voice data such as an operation command, etc. input through the microphone 42 of the head set 4, converts it into character data, and transfers the data to the robot control unit 2. The voice/character data conversion device 3 converts the character data transferred from the robot control unit 2 into voice data, and outputs the resultant data to the headphone 41 of the head set 4. A speaker device 5 is connected to the voice/character data conversion device 3, the speaker device 5 publicly addresses the voice input by an operator into the voice/character data conversion device 3 for public announcement and check of the input voice command.

The teaching pendant 6 comprises a liquid crystal display 61 for display of the status of various robots, operation programs, etc. and a keyboard 62 for settings of various data and for manually moving the robot mechanism unit 1 through the robot control unit 2. The information processing device 7 is a computer for man aging the robot control unit 2, and is formed by a personal computer, etc. It comprises a display 71 and a keyboard 72 for input of various data and commands. The teaching pendant 6 and the head set 4 are directly used by an operator. Therefore, the teaching pendant 6 is not separate from the voice/character data conversion device 3 as shown in FIG. 1, but the voice/character data conversion device 3 can be mounted on the teaching pendant 6.

Figure 2:
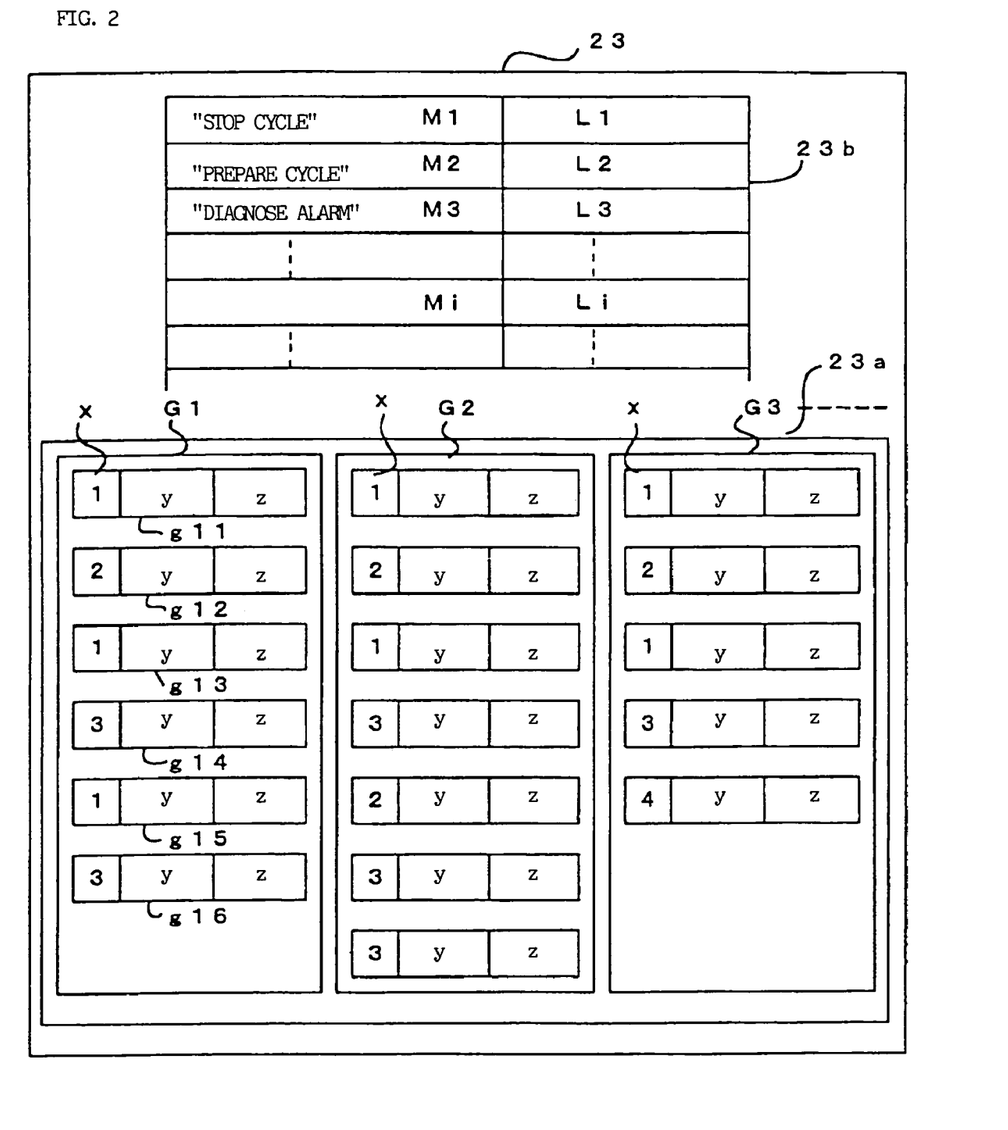
FIG. 2 is a block diagram showing the details of the executing program and the management data of the robot according to the embodiment.

FIG. 2 is a block diagram showing the details of the robot program 23a and the management data 23b stored in the program memory 23. The management data 23b stores an operation command issued an operator by voice to the robot through the microphone 42 of the head set 4. For example, a plurality of operation commands M1, M2, M3, . . . such as a command M1 "stop cycle" issued to stop the operation of a robot and stop the production cycle, a command M2 "prepare to resume" issued to prepare for the resumption of cycle stopped by the command M1 "stop cycle", a command M3 "diagnose alarm" issued to specify the cause of an alarm when it is given, etc. are stored. The management data 23b stores link information L1, L2, L3, . . . for designation of groups G1, G2, G3, . . . of an executing program corresponding to each of the operation commands M1, M2, M3, . . .

The robot program 23a stores a number of executing programs to be executed by the processor 21. The stored executing programs in the program memory store executing program groups Gi (i=1, 2, 3, . . . ) which are possibly to be executed to realize an instruction of an operation command Mi such as a group G1 of one or more executing programs which are possibly to be executed to realize an instruction of an operation command M1, a group G2 of one or more executing programs which are possibly to be executed to realize an instruction of an operation command M2, a group G3 of one or more executing programs which are possibly to be executed to realize an instruction of an operation command M3, etc.

Furthermore, each group Gi stores one or more executing programs, and each executing program includes an execution order x, a determination section y for determining whether or not the executing program is to be executed, and an execution section z for actually performing an operation when the determination section y determines the execution. In the example of the group G1 shown in FIG. 2, the group G1 includes executing programs g11 to g16, and executing programs g11, g13, and g15 are assigned the execution order of "1", an executing program g12 is assigned the execution order of "2", and executing programs g14 and g16 are assigned the execution order of "3". The executing programs assigned the same execution orders can be determined to be executed in any order and can be executed based on the determination result. It is determined whether or not the subsequent executing program has a higher execution order, and an executing program having a higher execution order is to be executed first (for example, a program assigned an execution order 1 is to be executed prior to execution of the program assigned an execution order 2). In the group, the reason why the executing programs are not stored in the execution order from the highest to the lowest is that the executing programs can be added or changed with the execution orders specified so that the executing programs can be easily added or changed.

The determination section y stores a condition of executing the programs stored in the execution section z, etc. on which the programs in the execution section z are to be executed.

When an operation command is executed, the method of realizing the specified operation command depends on the operation status of a robot when the operation command is input. In the present embodiment, a plurality of executing programs in which an operation command is realized depending on the operation status of a robot are stored. Furthermore, a series of executing programs up to the completion of the operations of an operation command are not stored, but an operation is divided into a number of operation units, and each operation command is executed by a combination of the operation units. Therefore, for an operation command, an executing program which can be executed is assigned an execution order. An operation to be first performed is assigned the execution order of "1", and the determination section y determines whether or not all executing programs having the execution order of "1" are to be executed depending on the operation status of the robot, with the result that executing programs to be executed are executed. Next, all executing programs having the execution order of "2" are determined depending on the operation status of the robot as to whether or not they are to be executed, and executing programs to be executed are executed. Similarly, the process is repeated up to the last execution order, thereby completing the specified operation command depending on the operation status of the robot.

For example, if an operator issues an operation command "stop cycle" by voice through the microphone 42 of the head set 4. It is converted by the voice/character data conversion device 3 into character data, and transmitted to the processor 21 through a communications port 26. The processor 21 checks whether or not there are data in the management data 23b of the program memory 23 which correspond to the character data, and retrieves the operation command M1. According to the link information L1 stored corresponding to the operation command M1, the executing program group Gi in the robot program 23a is specified. Then, the determination section y processes the executing program having the execution order x of "1" (for example, g11), from among the executing programs g11 to g16 of the group G1. More specifically, the process determined by the determination section y is to refer to the current position of a robot and a signal status in the robot status data 22b in the system memory 22, and to determine whether or not the condition for executing the program of the execution section z is satisfied. If it is determined that the program is to be executed, the executing program of the execution section z is executed. If it is determined not to execute the program, the process of the executing program of the execution section z is not performed.

For example, by referring to the example shown in FIG. 2, after the completion of the process of the executing program g11 assigned the execution order x of "1", the same processes (the determination as to whether or not an executing program is to be executed by the determination section y, and the process by the execution section z when determined that it is to be executed) are performed on the executing programs g13 and g15 also assigned the execution order x of "1". After the executing programs assigned the execution order x of "1" in the group G1 of the executing programs are all executed, the executing programs g12 assigned the execution order x of "2" are executed. Then, the executing programs g14 and g16 assigned the execution order x of "3" are executed. When the execution order reaches the maximum value, the process terminates.

If it is predetermined that, if any one of the executing programs g11, g13, and g15 assigned the execution order x of "1" is executed, the others do not have to be executed, then it is determined by the determination means of the executing program g11 assigned the execution order x of "1" as to whether or not the program is to be executed. If determined that it is to be executed, it is determined that the executing programs g13 and g15 assigned the same execution order x of "1" are not executed without the determination of the determination means of g13 and g15. Then the executing program g12 assigned the execution order x of "2" is executed, thereby omitting unnecessary determination and improving the efficiency of the entire process.

As described above, an executing program to be executed is selected for a voice-ordered operation command depending on the operation status of the robot system such as the current position of the robot, the I/O signal status, etc., and only the program of the necessary execution section z is executed without executing an unnecessary program or a program not to be executed, thereby safely and correctly performing the process automatically according to the intention of an operator who has issued an operation command.

Figure 3:
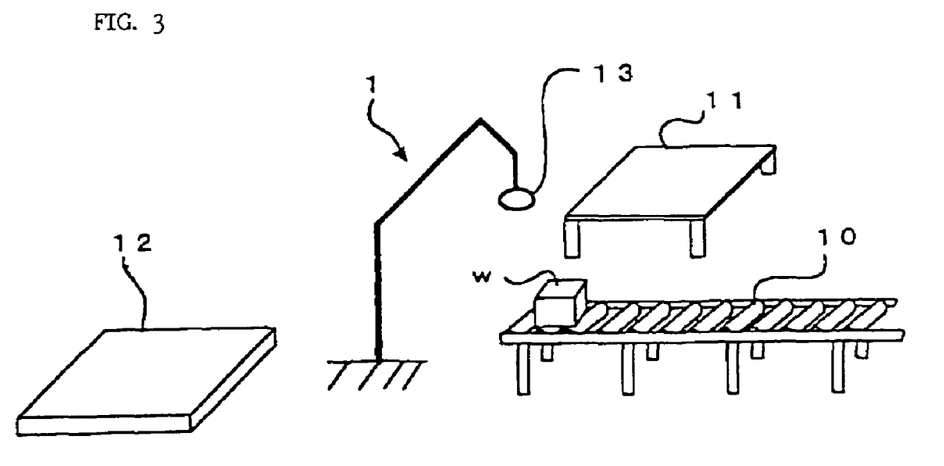
FIG. 3 is an explanatory view of a practical example to which the present invention is applied.

For comprehensibility of the present invention, FIG. 3 shows a practical example of the present invention. By referring to the example, an operation of a robot performed when it carries a heavy object and an operator issues an operation command "stop cycle" is explained.

The robot mechanism unit 1 holds a workpiece W carried by a conveyor 10, and performs an operation of laying the workpiece on a pallet 12. Near the conveyor 10, a provisional table 11 is prepared. First, the robot drives the robot mechanism unit 1, moves the tip of the robot arm toward the conveyor 10, and holds the workpiece W using an end effector 13 attached to the tip of the robot arm. The robot lifts the workpiece W for a predetermined height while holding the workpiece W, and horizontally moves it to the point above the pallet 12. When the workpiece reaches the point above the pallet 12, the robot lowers the workpiece W and lays it on the pallet 12. The operation is repeatedly performed by the robot.

Figure 4:
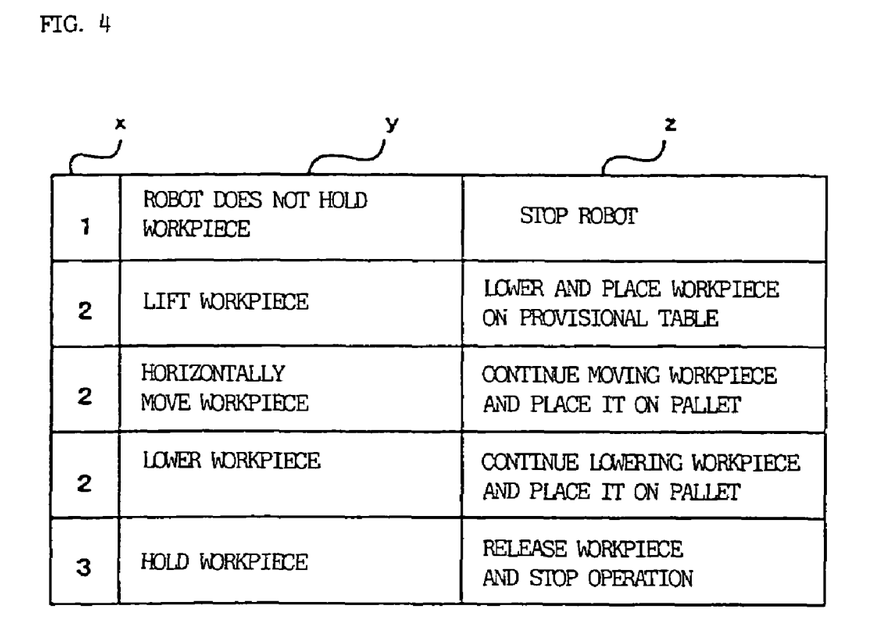
FIG. 4 is an explanatory view of an example of an operation program group stored for an operation command "stop cycle" in the embodiment.

In the above-mentioned operations of a robot, five executing programs are stored in this example for the operation command "stop cycle" as shown in FIG. 4. There is one executing program assigned the execution order of 1 for the case in which the end effector of the robot is not holding the workpiece W. In this case, the robot can immediately stop its operation. When there is an instruction "stop cycle" issued, the determination section y of an executing program assigned the execution order of 1 checks whether or not the robot is holding a workpiece. If not, the robot stops its operation in the process of the execution section z.

There are three operation programs assigned the execution order of 2 respectively specifying the necessary operations of the robot when the robot is lifting a workpiece, when the robot is horizontally moving a workpiece, and when the robot is lowering a workpiece. When the robot is not holding a workpiece W, the robot stops its operation according to the operation program assigned the execution order of 1. Therefore, when the determination section y of the operation program assigned the execution order of 2 is evaluated, the robot necessarily holds the workpiece W. When the robot is lifting a workpiece W while holding it, the robot lowers the workpiece W, and puts it on the provisional table 11. When the robot is horizontally moving the workpiece W while holding it, the robot continues the horizontal movement, and performs an operation of laying the workpiece W on the pallet 12. When the robot is lowering the workpiece W while holding it, the robot continues lowering the workpiece W and lays it on the pallet 12.

In the executing program assigned the execution order of 3, when the robot is holding the workpiece W, the workpiece W is released and the robot is stopped. According to the executing program assigned the execution order of 2, the robot necessarily lays the workpiece W on the provisional table 11 or the pallet 12 while holding the workpiece W. By contrast, according to the executing program assigned the execution order of 3, the robot releases the workpiece W and stops its operation.

Although the robot is horizontally moving the workpiece W while holding it, for example, if the robot is moving at a low speed and also the robot is to return the workpiece W to the provisional table 11, then the operation condition of the executing program which is assigned the execution order of 2 and is to be executed when the robot is horizontally moving a workpiece is changed so as to be applied to the case where the robot is horizontally moving the workpiece at a high speed. Then, newly generated is an executing program assigned the execution order of 2 for stopping horizontally moving the workpiece W and placing it on the provisional table wherein, when the robot is horizontally moving it at the low speed, such horizontal moving is interrupted to place the workpiece W on the provisional table, so that the resultant program is added to the group of executing programs for the operation command "stop cycle".

Thus, an operator can easily teach a robot depending on the status of the robot how to operate to follow the instruction of an operation command.

Figure 5:
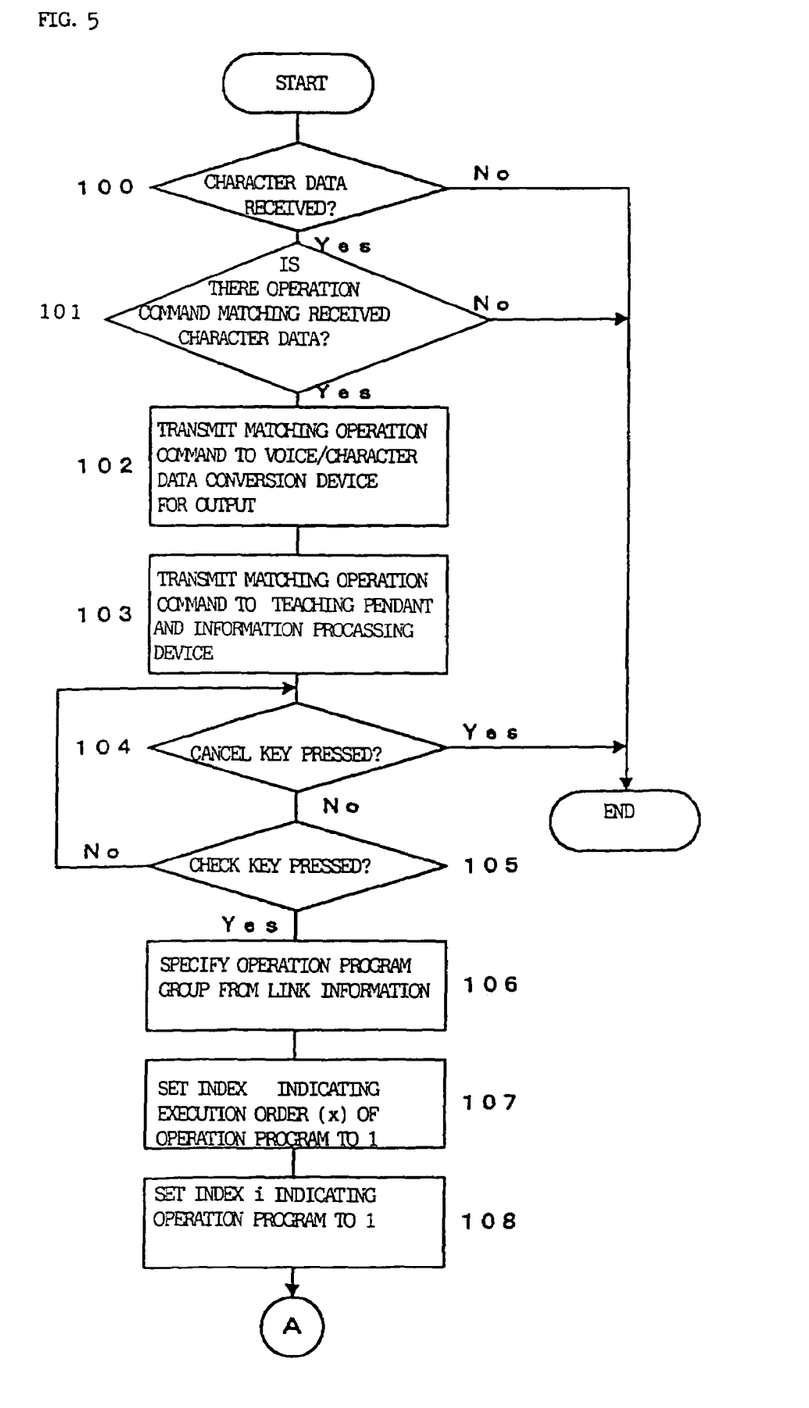
FIG. 5 is a flowchart of the operation processing according to the embodiment.
Figure 6:
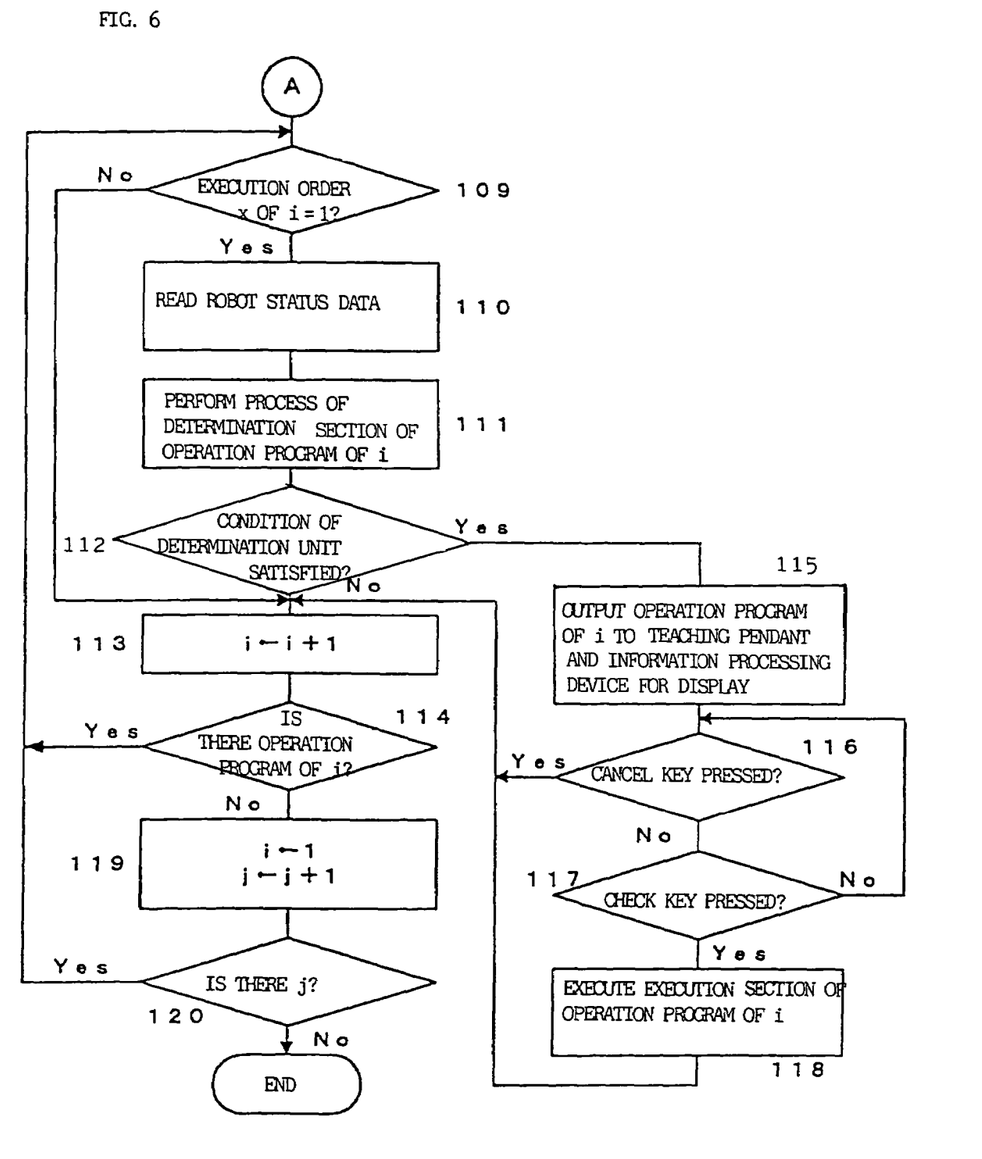
FIG. 6 is a flowchart continuing from FIG. 5.

FIGS. 5 and 6 are flowcharts of the processes performed by the processor 21 of the robot control unit 2 according to the present embodiment of the present invention on a predetermined cycle.

The processor 21 determines whether or not character data has been received (step 100). If not received, the process of cycle terminates. If received, it is determined whether or not there is an operation command corresponding to the received character data in the management data 23b (step 101). If there is no character data (operation command) corresponding to the management data, the process of the cycle terminates. Since there is no corresponding character data (operation command) attributes to an incorrect input, the information indicating a possible incorrect input can be transmitted to the voice/character data conversion device 3

(further to the teaching pendant 6 and information processing device 7) to announce it to the operator by voice, character, lamp, buzzer, etc.

When there is an operation command corresponding to the character data input in the operation command stored in the management data 23*b*, this operation command is transmitted to the voice/character data conversion device 3, the operation command is output by the speaker device 5 (step 102), and then transmitted to the teaching pendant 6 and the information processing device 7, and the operation command is displayed on the display units 61 and 71 (step 103). Furthermore, it is displayed on the display screen of the operation panel not shown in the drawings. The reception of an operation command may also be announced by a lamp. In this case, the color of the luminous light of the lamp is different from the color of the lamp indicating no reception of an operation command.

An operator checks the operation command generated by the speaker device 5 or displayed on the display units 61 and 71, operates the keyboard 62 or 72 of the teaching pendant 6 or the information processing device 7, presses a cancel key if it is incorrect, or presses a check key if it is correct. The processor 21 determines which key has been pressed, the cancel key or the check key (steps 104 and 105). If the cancel key has been pressed, the process terminates, and input of character data is awaited again. If the check key has been pressed, then an executing program group is designated according to the link information stored for the operation command corresponding to the input character data (step 106).

In each executing program in the executing program group, the index j specifying the execution order x stored in each program is set to "1" (step 107), and the index i indicating the executing program (g11, g12, ..., etc.) itself is set to "1" (step 108). Then, it is determined whether or not the execution order x for the executing program indicated by the index i coincide with the index j (step 109). If not coinciding, then processing proceeds to step 113, the index i is increment by "1", and it is determined whether or not there is an executing program corresponding to the index i (step 114). If there is, processing returns to step 109, and it is determined whether or not the execution order x set in the executing program of the index i coincides with the index j.

Thus, the processes in steps 109, 113, and 114 are repeated until the execution order x of the executing program of the index i coincides with the index j. If the execution order x coincides with the index j, the robot status data stored in the system memory 22 is read (step 110), and the process stored in the determination section y of the operation program whose execution order coincides with the index j is performed (step 111). Then, performed is the process of determining whether or not the read robot status data satisfies the condition for performing the process stored in the execution section z of the executing program (step 112). If not satisfying the condition, processing proceeds to step 113. If satisfying the condition, the program stored in the execution section z of the executing program indicated by the index i is transmitted to the teaching pendant 6 and the information processing device 7, and is displayed on the display units 61 and 71 (step 115).

The operator checks the displayed executing program (steps 116 and 117). If it is to be executed, then the check key of the keyboard 62 of the teaching pendant 6, or the check key of the keyboard 72 of the information processing device 7 is operated. When the processor 21 detects the input through the check key (step 117), it performs the process of storing in the execution section z of the executing program (step 118), and then processing returns to step 113. If the operator inputs a cancel command by operating the cancel key by checking the executing program displayed in step 115 (step 116), then processing returns to step 113 without executing the executing program.

The processes from step 109 to step 118 are repeated, it is determined through the process of the determination section y whether or not the executing program whose execution order x is indicated by the index j is to be executed. The executing program determined to be executed performs the process of the execution section z. The executing program determined not to be executed is not executed, and processing proceeds to the next executing program.

Thus, the index i is updated in step 113. If it is detected in step 114 that there is no recorded executing program corresponding to the index i, it indicates that there is no execution order x indicated by the index j. Therefore, processing proceeds from step 114 to step 119, the index i is set to "1", and the index j is incremented by "1". Then, it is determined whether or not there is an execution order x corresponding to the index j. If there is, the processes in and after step 109 are performed. If there is not, the process terminates.

Thus, starting from the execution order x of "1" indicated by the index j, the index i specifying an executing program is sequentially incremented from "1", and an executing program assigned the execution order of "1" is detected in all executing programs in the operation group. If it is determined by the determination section y that the executing program is to be executed, then the program stored in the execution section z is executed. Then, the index j is updated into "2", the similar process is performed on the execution order x=2. Thus, only necessary executing programs are automatically executed until there are no execution orders stored while sequentially updating the index j.

In the above-mentioned embodiments, processing proceeds from step 118 to step 113, but processing may proceed from step 118 to step 119, then after determining that the execution section z of the executing program is to be executed, processing may proceed to the determining process as to whether or not the program assigned the next execution order is to be executed without determining by the determination section y whether or not the executing programs assigned the equal execution order are to be executed.

In the above-mentioned embodiments, a command to a robot is input by voice. Thus, without performing any operation, the command can be issued to the robot. Therefore, even an unskilled operator can easily issue a command to a robot. The command can be input from the teaching pendant 6 or the information processing device 7, instead of voice. For example, from the keyboard 62 or 72 of the teaching pendant 6 or information processing device 7, a message (character data) of an operation command can be input, and furthermore an operation command of the management data 23*b* stored in the program memory 23 can be displayed on the display unit 61 or 72 of the teaching pendant 6 or the information processing device 7, and the displayed operation command is selected and specified, thereby inputting the instruction to the robot. Thus, the subsequent operation processing after the input is similarly performed as in the above-mentioned embodiments.

In the above-mentioned embodiments, the executing programs stored in the groups G1, G2, G3, . . . of the executing program are not stored as a series of executing programs for an operation command up to the completion of the operation of the operation command, but an operation is divided into operation units so that a combination of operation units can execute each operation command. This is to prevent the overlapping, etc. of executing programs. However, a series of executing programs up to the end of the operation can be stored depending on the robot operation status. In this case, one executing program is executed depending on the robot operation status for an operation command.

What is claimed is:

1. An industrial robot, comprising:
   storage means for storing a plurality of operation commands in which one or more executing programs are associated with each of said operation commands;
   means for detecting an operation command corresponding to an input operation command, from among the plurality of operation commands stored in the storage means;
   determination means for determining whether or not one or more executing programs corresponding to the detected operation command are to be executed, according to the status of a robot; and
   means for executing said executing program determined to be executed.

2. The industrial robot according to claim 1, wherein a determination order is preset by said determination means on the plurality of executing programs corresponding to each of said operation commands.

3. The industrial robot according to claim 1, further comprising voice input means for inputting an operation command by voice of an operator.

4. The industrial robot according to claim 3, wherein said voice input means is provided for a teaching pendant of said industrial robot.

5. The industrial robot according to claim 3 or 4, further comprising public address system using an operator's voice.

6. The industrial robot according to claim 1, further comprising:
   means for displaying contents of said executing program determined to be executed; and
   means for accepting an execution permission.

7. The industrial robot according to claim 1, wherein an accepted operation command is displayed using characters on a teaching pendant of said industrial robot or a screen of an operation panel.

8. The industrial robot according to claim 1, wherein an accepted operation command is displayed using characters on a screen of an information processing device connected to said industrial robot.

9. The industrial robot according to claim 1, wherein an accepted operation command is also notified by a lamp or voice.

10. An industrial robot, comprising:
    storage means for storing a plurality of operation commands and a predetermined units of execution programs that may be required to execute and complete said operation command, in which said executing programs are associated with each of said operation commands and execution order;
    means for detecting an operation command corresponding to an input operation command, from among the plurality of operation commands stored in the storage means;
    determination means for determining whether or not the executing programs corresponding to the detected operation command are to be executed according to the status of a robot and the execution order; and
    means for executing said executing program determined to be executed.

11. The industrial robot according to claim 2 or 10, wherein in case where said determination means determine to execute one executing program, among a plurality of executing programs corresponding to said each operation command, the determination means determine not to execute the other executing programs in the same execution order.

* * * * *